United States Patent [19]

Gross et al.

[11] Patent Number: 5,223,207
[45] Date of Patent: Jun. 29, 1993

[54] EXPERT SYSTEM FOR ONLINE SURVEILLANCE OF NUCLEAR REACTOR COOLANT PUMPS

[75] Inventors: Kenny C. Gross, Bolingbrook; Ralph M. Singer, Naperville, both of Ill.; Keith E. Humenik, Columbia, Md.

[73] Assignee: The United States of America as represented by the United States Department of Energy, Washington, D.C.

[21] Appl. No.: 827,776

[22] Filed: Jan. 29, 1992

[51] Int. Cl.$^5$ .............................................. G21C 7/00
[52] U.S. Cl. ..................... 376/216; 376/215; 376/217; 364/492; 395/914; 395/915
[58] Field of Search ........................ 376/215, 216, 217; 364/492; 395/914, 915

[56] References Cited

U.S. PATENT DOCUMENTS

| Re. 33,162 | 2/1990 | Yoshida et al. | 364/492 |
|---|---|---|---|
| 4,803,040 | 2/1989 | Gross | 376/216 |
| 4,816,208 | 3/1989 | Woods et al. | 376/259 |
| 4,961,898 | 10/1990 | Bogard et al. | 376/245 |
| 4,965,743 | 10/1990 | Malin et al. | 364/513 |
| 5,009,833 | 4/1991 | Takeuchi et al. | 376/217 |

OTHER PUBLICATIONS

Kenny C. Gross & Keith E. Humenik-Sequential Probability Ratio Test for Nuclear Plant Component Surveillance, May 23, 1990, pp. 131-137.

Wayne K. Lehto & Kenny C. Gross-Expert System Applications in Support of System Diagnostics and Prognostics at EBR-II, Aug. 14-18, 1989, pp. 1-25.

Primary Examiner—Donald P. Walsh
Assistant Examiner—Chrisman D. Carroll
Attorney, Agent, or Firm—Bradley W. Smith; John M. Albrecht; William R. Moser

[57] ABSTRACT

An expert system for online surveillance of nuclear reactor coolant pumps. This system provides a means for early detection of pump or sensor degradation. Degradation is determined through the use of a statistical analysis technique, sequential probability ratio test, applied to information from several sensors which are responsive to differing physical parameters. The results of sequential testing of the data provide the operator with an early warning of possible sensor or pump failure.

9 Claims, 2 Drawing Sheets

EXPERT SYSTEM FOR ONLINE SURVEILLANCE OF NUCLEAR REACTOR COOLANT PUMPS

CONTRACTUAL ORIGIN OF THE INVENTION

The United States Government has rights in this invention pursuant to Contract No. W-31-109-ENG-38 between the U.S. Department of Energy and The University of Chicago.

BACKGROUND OF THE INVENTION

Reactor coolant pump degradation can produce severe economic penalties for nuclear power plants which have to shut down for extended periods of time in response to a possible coolant pump failure. As a result, there is a strong economic incentive to develop and commercialize an effective apparatus to provide for early detection of coolant pump problems. Early detection of a coolant pump degradation would allow the reactor operator to manually trip the reactor before major pump damage occurred as opposed to the operator experiencing an automatic rapid shutdown of the reactor due to the loss of coolant caused by a damaged pump or a false alarm caused by a defective sensor. A controlled response would allow maintenance to be performed on the pump prior to failure or severe damage or to pinpoint a sensor problem and thus, limit the reactor down time.

The current general practice is to evaluate the condition of the reactor's coolant pump through the use of high/low limit checks of the pump's operating parameters. Using this system, when the coolant pump parameters read outside of a zone defined by the high/low values, an alarm is sounded, and the pump is shut down resulting in lost operating time. This type of analysis can result in a high number of false alarms and missed alarms when compared to an artificial intelligence technique which more closely analyzes the pump parameters as measured by a set of pump sensors.

Artificial intelligence techniques in an expert system continually survey and diagnose pump performance and operability as a means of detecting the early stages of pump degradation. Since most pumps are equipped with numerous sensors to monitor the condition of the pump, the sensors provide a good data base for use by the expert system. Applicants' expert pump diagnosis system continuously monitors and compares the digitized signals representing a variety of variables associated with the physical condition of the coolant pump: speed, vibration level, power, and discharge pressure. Variation of these variables is a possible indication of off-normal operation of the pump. Applicants' invention uses an expert system based on a mathematical comparison and analysis of multiple signals from a pair of nuclear reactor coolant pumps to analyze the condition of the coolant pump using the aforementioned input signals.

Accordingly, it is an object of this invention to provide an expert system for early detection of coolant pump degradation so as to provide the operator with information on this condition prior to pump failure.

A further object of this invention is to provide an expert system for determining sensor degradation as opposed to pump failure.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

SUMMARY OF THE INVENTION

To achieve the foregoing and other objectives and in accordance with the purposes of the present invention, as embodied and broadly described herein, the present invention provides for a means to determine the degradation of a nuclear reactor cooling pump and the degradation of sensors used to measure various parameters associated with the cooling pump. Applicants' invention accomplishes this through the use of an expert system employing a sequential probability ratio test (SPRT) to evaluate parametric data associated with the function of the coolant pump. The SPRT technique requires the presence of duplicate sensors on each of two or more pumps. This system provides the reactor operator with an early warning system to allow an orderly shut down of the pump for sensor or pump degradation in lieu of a rapid emergency shut down of the pump.

DETAILED DESCRIPTION OF THE INVENTION

The subject invention teaches a expert system and method to determine the degradation of nuclear reactant coolant pumps and their respective sensors prior to failure.

Figure 1:
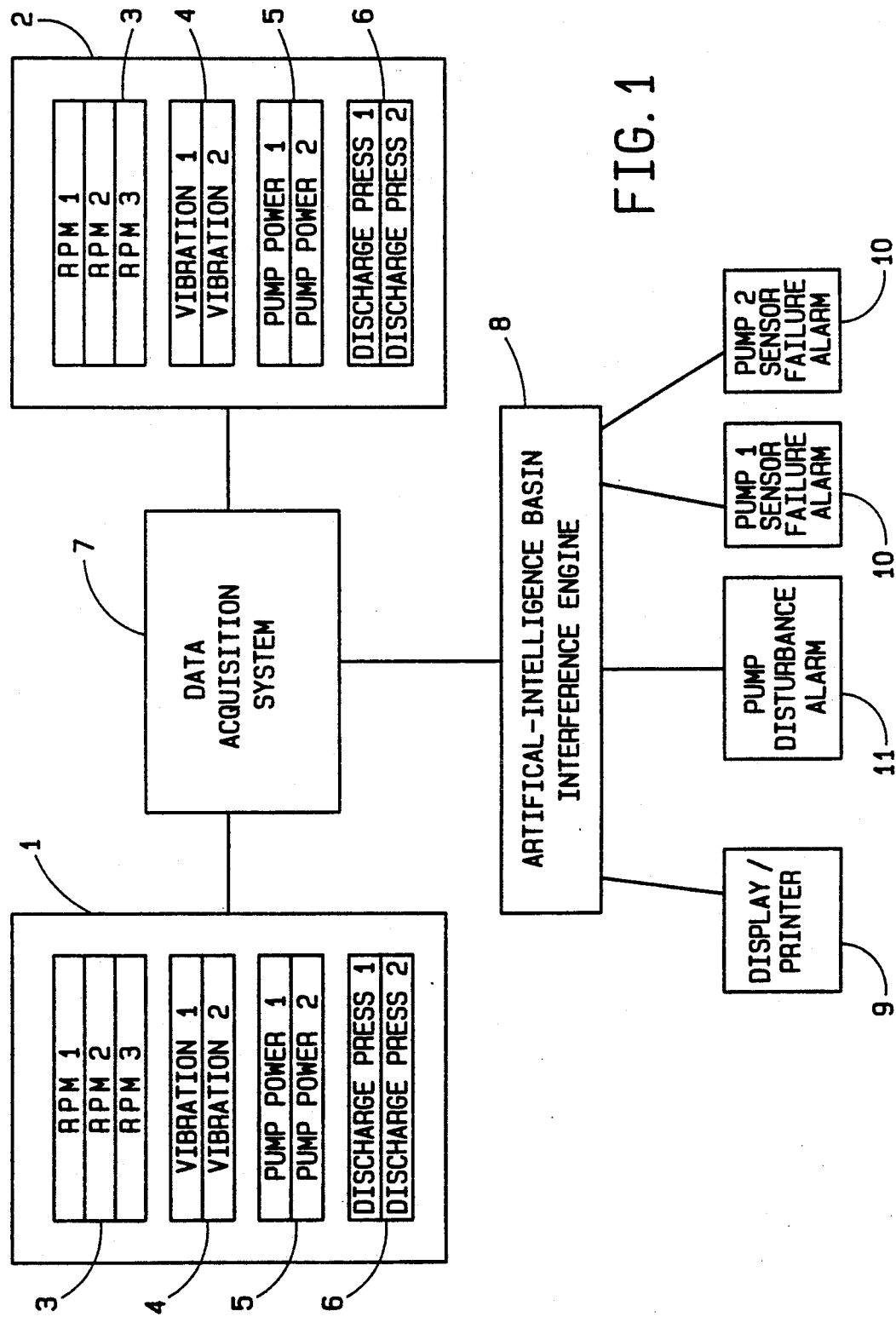
FIG. 1 represents the expert system for online surveillance of a set of nuclear reactor coolant pumps.

FIG. 1 illustrates the architecture of the expert system for an online pump-surveillance system. The two coolant pumps 1 and 2 are each equipped with numerous sensors. A typical sensor arrangement is depicted in FIG. 1 where seven sensors are employed: three which monitor the rotor shaft speed 3, two accelerometers 4 which monitor the mechanical vibration of the pump, a pump power measuring device 5 which measures the power needed by the motor to turn the rotor, and a discharge pressure transducer 6 which measures the flow rate of coolant through the pump. The information from the sensors is transmitted to the data acquisition system 7 (DAS) which then interfaces with the artificial intelligence (AI) based inference engine 8. The AI inference engine 8 implements an operability logic algorithm illustrated in FIG. 2. The AI software for the inference engine 8 is supported by a layer of utility routines which perform generic functions such loading external tables, access to shared knowledge base, interprocess synchronization, and network communication. Output from the AI engine 8 is integrated to a color-graphics display 9 in the reactor room and is multiplexed back to the data acquisition system 7 for archive backup storage. If the inference engine 8 detects a degradation in the pump or its sensors an audible alarm is sounded indicating a pump sensor failure 10 or a pump disturbance 11.

Figure 2:
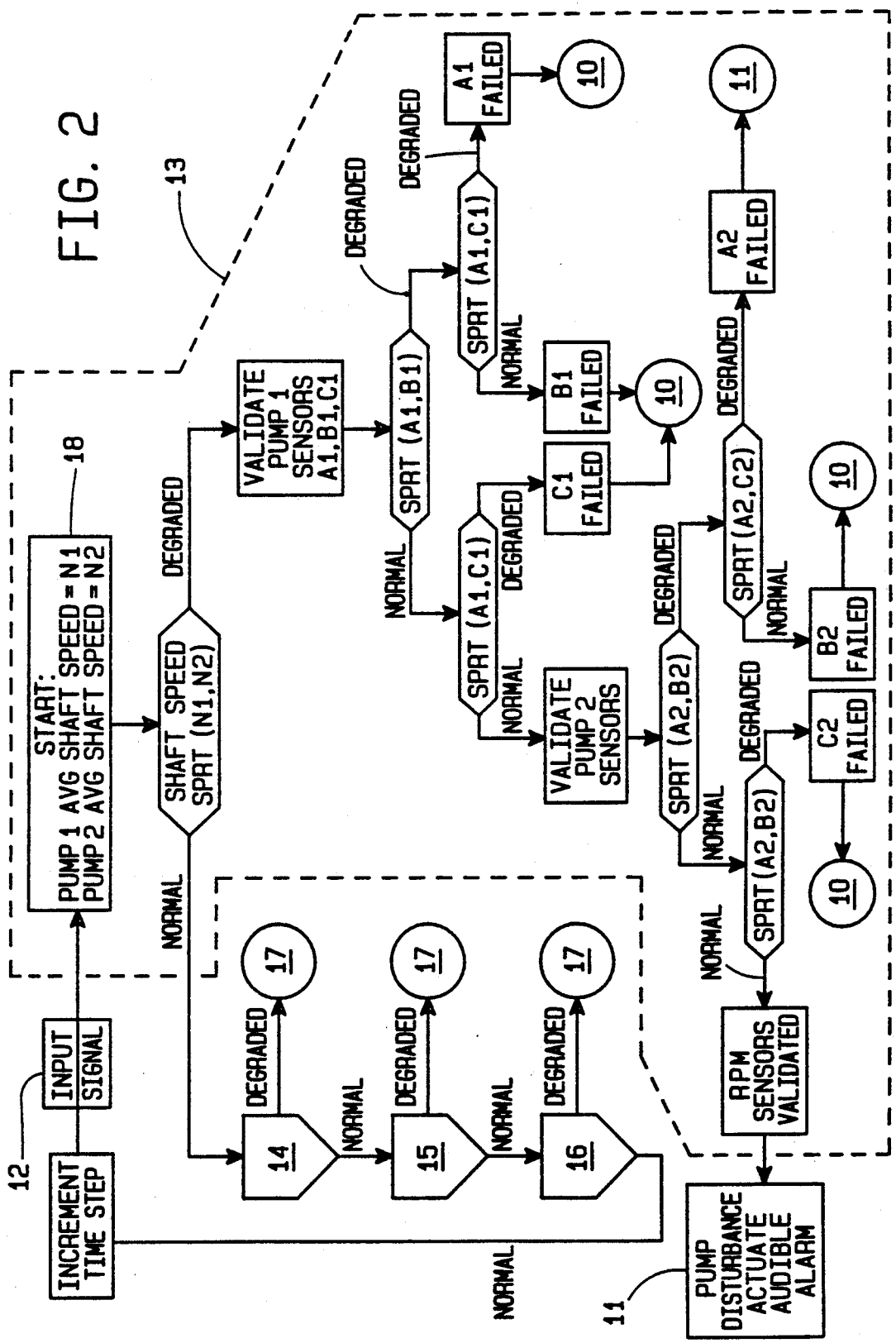
FIG. 2 depicts the logic diagram for the expert pump-surveillance system.

FIG. 2 illustrates a flow chart for determining the condition of the cooling pumps through the employment of a sequence of mathematical algorithms associated with a series of sequential probability ratio test (SPRT) modules. The input signals 12 are acted on mathematically by a sensitive pattern recognition technique, the sequential probability ratio test (SPRT). The use of the SPRT technique through several if-then steps provides for early annunciation of sensor operability or degradation of the coolant pump. Each of the modules 13, 14, 15, and 16 employs the SPRT technique to determine the condition of the respective sensors for the purpose of determining if a problem is sensor or pump related. The modules present in the expert system include the shaft speed SPRT module 13, the vibration level SPRT module 14, the power signal SPRT module 15, and the discharge pressure SPRT module 16. Each SPRT module is connected to an audible alarm 17 which is sounded when a sensor degradation is determined. If no sensor degradation is determined the degradation is determined to be due to the pump and the pump disturbance alarm 11 is sounded.

Basically, the SPRT modules monitor and compare the signals from two similar sensors which respond to a single parameter representing a physical condition associated with the pump. The purpose of this comparison is to identifying subtle changes in the statistical quality of the noise associated with either signal when compared one to the other. In applications involving two or more reactor coolant pumps equipped with identical sensors, a SPRT monitor applied to the pumps will provide a sensitive annunciation of any physical disturbance affecting one of the pumps. If each of the pumps had only one sensor, it would not be possible for the SPRT technique to distinguish between a pump degradation event and a degradation of the sensor itself. However, when each pump is equipped with multiple, redundant sensors, the SPRT technique can be applied to pairs of sensors on each individual pump for sensor-operability verification.

As is illustrated in the logic diagram of FIG. 2, the expert system is synthesized as a collection of if-then type rules. Each SPRT module processes and compares the stochastic components of the signals from two sensors that are ostensibly following the same physical process. If any physical disturbance causes the noise characteristics for either signal to change, that is a larger variance, skewness, or signal bias, then the SPRT provides a sensitive and rapid annunciation of that disturbance while minimizing the probabilities of both false alarms and missed alarms.

The processor 18, of module 13, first interrogates the signals N1 and N2, representing the mean shaft speed for pump 1 and pump 2, respectively. The mean shaft speed signal is obtained by averaging the outputs of the three RPM sensors 3, FIG. 1 on each pump. If a problem is identified in the comparison of N1 and N2, a sequence of SPRT tests is invoked to validate the three sensors on pump 1, signified by A1, B1, and C1. If one of those sensors is identified as degraded, an audible alarm 11 is actuated. If the three sensors on pump 1 are found to be operating within tolerance, then the three corresponding sensors on pump 2 are tested. If all six sensors are confirmed to be operational, execution is passed to the next SPRT module which in this case is SPRT module 14 which tests the vibration-level variable. If these sensors are found to be operational, then the testing is functionally shifted to module 15 the power-signal variable, and then if it is found to be functioning properly to module 16 the discharge-pressure variable. This sequential organization is illustrated in FIG. 2. If a problem is identified in any module, an audible alarm, 10, 11 or 17 is sounded in the reactor control room, and the operator can initiate a manual shutdown of the reactor to repair the identified problem.

The objective of the AI engine in the applicants' expert system is to analyze successive observations of a discrete process Y which represents a comparison of the stochastic components of two physical processes monitored by similar sensors. Let $y_k$ represent a sample from the process Y at time $t_k$. During normal operations with an undergraded physical system and with sensors that are functioning within specifications, the $y_k$ should be normally distributed with means O. If the two signals being compared do not have the same nominal means due, for example, to differences in calibration, then the input signals will be pre-normalized to the same nominal mean values during initial operation.

The specific goal of the AI engine is to declare system 1 or system 2 degraded if the drift in Y is sufficiently large that the sequence of observations appears to be distributed about means $+M$ or $-M$, where M is a preassigned system distribution magnitude. The SPRT provides a quantitative framework that enables us to decide between two hypotheses, H1 and H2, namely:

H1: Y is drawn from a Gaussian product distribution function (PDF) with means M and variance $\sigma^2$.

H2: Y is drawn from a Gaussian PDF with mean O and variance $\sigma^2$.

If it is supposed that H1 or J2 is true, we wish to decide for H1 or H2 with probability $(1-\beta)$ or $(1-\alpha)$ respectively, where $\alpha$ and $\beta$ represent the error (misidentification) probabilities.

From the theory of Wald and Wolfowitz, "*Optimum Character of the Sequential Probability Ratio Test*," *Ann. Math. Stat.*, 19,326 (1948), the most powerful test depends on the likelihood ratio $l_n$, where Probability of observed sequence given $H1$ true $$l_n = \frac{y_1, y_2, \ldots, y_n}{y_1, y_2, \ldots, y_n}$$

Probability of observed sequence given $H2$ true

After n observations have been made, the sequential probability ratio is just the product of the probability ratios for each step:

$$l_n = (PR1) \cdot (PR2) \cdot (PR3) \cdot \ldots (PRn)$$

or $$l_n = \prod_{i=1}^{n} \frac{f(y_i \mid H_1)}{f(y_i \mid H_2)},$$

where $F(y_i | H)$ is the distribution of the random variable y.

The Wald-Wolfowitz theory operates as follows: Continue sampling as long as $$A < l_n < B \qquad (1)$$

Stop sampling and decide H1 as soon as $l_n \geq B$, and stop sampling and decide H2 as soon as $l_n \leq A$. The acceptance thresholds are related to the error (misidentification) probabilities by the following expressions:

$$A = \frac{\beta}{1-\alpha} \text{ and } B = \frac{1-\beta}{\alpha} \quad (2)$$

where $\alpha$ = probability of accepting H1 when H2 is true (false alarm probability)

$\beta$ = probability of accepting H2 when H1 is true (missed alarm probability)

Assuming the random variable $y_k$ is normally distributed, the likelihood that H1 is true (mean M, variance $\sigma^2$) is given by $$L(y_1, y_2, y_3, \ldots y_n | H1) = \quad (3)$$

$$\frac{1}{(2\pi)^{n/2}\sigma^2} \exp\left[-\frac{1}{2\sigma^2}\left(\sum_{k=1}^{n} y_k^2 - 2\sum_{k=1}^{n} y_k M + \sum_{k=1}^{n} M^2\right)\right].$$

Similarly for H2 (means O, variance $\sigma^2$), $$L(y_1, y_2, y_3, \ldots y_n | H2) = \frac{1}{(2\pi)^{n/2}\sigma^n} \exp\left(-\frac{1}{2\sigma^2} \sum_{k=1}^{n} y_k^2\right) \quad (4)$$

The ratio of equations (3) and (4) gives the likelihood ratio $l_n$; where $l_n$ is expressed as $$l_n = \exp\left[\frac{-1}{2\sigma^2} \sum_{k=1}^{n} M(M - 2y_k)\right] \quad (5)$$

combining equations 1, 2 and 5, and taking the natural logs, gives $$\ln[\beta/(1-\alpha)] < \frac{-1}{2\sigma^2} \sum_{k=1}^{n} M(M - 2y_k) < \ln[(1-\beta)\alpha]$$

where $$SRPT = \frac{-1}{2\sigma^2} \sum_{k=1}^{n} M(M - 2y_k) \text{ or}$$

$$= \frac{M}{\sigma^2} \sum_{k=1}^{n} \left(y_k - \frac{M}{2}\right)$$

then the sequential sampling and decision strategy can be concisely represented as If $SPRT \leq \ln(\beta/1 - \alpha)$ accept $H2$ If $\ln[\beta/(1 - \alpha)] < SPRT < \ln[(1 - \beta)/\alpha]$, continue sampling If $SPRT \geq \ln[(1 - \beta)/\alpha]$ accept $H1$ The SPRT analysis formulated here cannot be applied directly to non-Gaussian signals. For applications to nuclear system signals contaminated by non-Gaussian noise, an attempt must first be made to pretreat the input signals with a normalizing transformation.

For applications where (a) one requires a high degree of assurance that a system is functioning within specifications and (b) there is not a large penalty associated with false alarms, it is not uncommon to specify a B (missed alarm probability) that is much smaller than A (false alarm probability). n safety critical systems one may be more willing to incur a false alarm than a missed alarm. For applications where a large cost penalty is incurred with any false alarms, it is desirable to keep both A and B small.

The trade-off that must be considered before one specifies arbitrarily small values for A and B is the effect this may have on the sensitivity and maximum decision time needed by the SPRT to annunciate a disturbance. The desired sensitivity of the SPRT is fixed by specification of M, the system disturbance magnitude. For a given value of M, the average sample number required to reach a decision is influenced by A and B and also by the variance associated with the signals being monitored. It takes longer to identify a subtle change in a process characterized by a low signal-to-noise ratio than in one with a high signal-to-noise ratio.

The embodiments of the invention in which an exclusive property or privilege is claimed are defined as follows:

1. An expert system for determining the operability of a specified pump comprising:
    a set of pumps of which the specified pump is a member;
    means for measuring physical parameters representative to the operations condition each pump of said set of pumps;
    means for acquiring data generated by said measuring means;
    an artificial-intelligence based inference engine coupled to said data acquiring means where said inference engine applies a sequential probability ratio test to statistically evaluate said acquired data to determine a status for the specified pump and its respective measuring means by continually monitoring and comparing changes in a specific operational parameter signal acquired from a plurality of measurement means;
    means for transferring said status generated by said interference engine to an output system.

2. The system of claim 1 wherein said measuring means employs at least two sensors to measure a specific physical parameter associated with each pump.

3. The system of claim 2 in which said measuring means measures a plurality of physical parameters.

4. The system of claim 3 in which said inference engine employs said sequential probability ratio test in an ordered preference for each physical parameter to determine if the specified pump or a sensor is degraded.

5. The system of claim 4 in which an audible alarm is sounded when said sensor or said specified pump is determined to be degraded by said inference engine.

6. A method for early determination of pump or pump sensor degradation comprising the steps of:
    monitoring physical parameters representative of the operating condition of said pump through the use of a plurality of sensors;
    transmitting said data to a data acquisition system and subsequently to an artificial-intelligence inference engine;
    statistically analyzing on said data arriving at said inference engine through the use of a sequential probability ratio test; using said sequential probability ratio test to establish a status for said sensors and said pump;

transmitting said status to an output device.

7. The method of claim 6 which said sequential probability ratio test is conducted in a series of sequential if-then steps where each sensor is evaluated sequentially to determine if it is degraded and if said sensor is degraded passing said status to an audible alarm system as well as to an output display and if said sensor is not degraded proceeding to the next sensor.

8. The method of claim 7 where if said probability ratio test indicates that the system is degraded and if none of said sensors are degraded then determining that the pump is degraded and transmitting this information to an output device and an audible alarm.

9. The system of claim 1 where said physical parameters include: pump revolutions per minute, pump vibration measurements, pump power, and pump discharge pressure.

* * * * *